D. M. COOK.
Evaporating Pan.
No. 867
Reissued Dec. 20, 1859
Fig. 2.
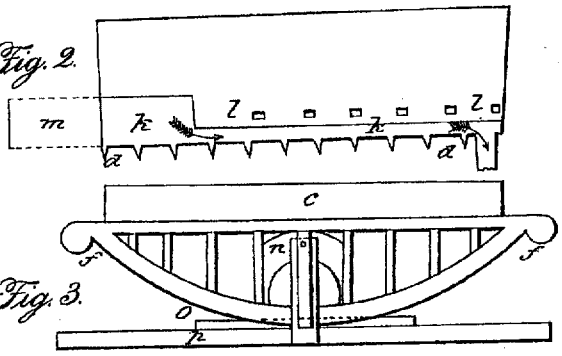
Fig. 3.
Fig. 1.
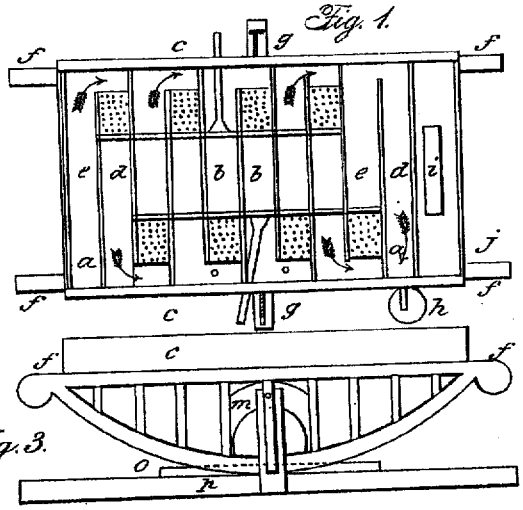
Fig. 3.
Fig. 4.
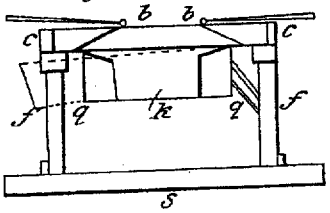
Fig. 5.
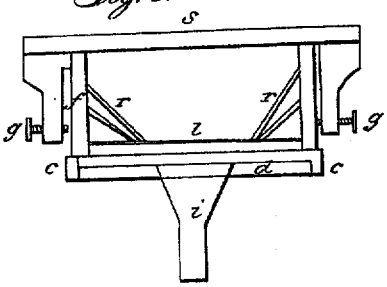
Witnesses:
H P Dons
R. C. Smith.
Inventor:
D. M. Cook.
AM. PHOTO-LITHO. CO. N.Y. (OSBORNE'S PROCESS.)

UNITED STATES PATENT OFFICE.

D. M. COOK, OF MANSFIELD, OHIO.

IMPROVEMENT IN PANS FOR EVAPORATING CANE-JUICE.

Specification forming part of Letters Patent No. 20,631, dated June 22, 1858; Reissue No. 867, dated December 20, 1859.

*To all whom it may concern:*

Be it known that I, D. M. COOK, of Mansfield, in the county of Richmond and State of Ohio, have invented a new and useful Improvement in Evaporating-Pans for Making Refined Sugar Direct from Sugar-Juices; and I do hereby declare that the following is a full, clear, and exact description of the same, reference being had to the accompanying drawings, forming a part of this specification, in which—

Figure is a vertical longitudinal section of an evaporator constructed with my improvements. Fig. 2 is a transverse section. Fig. 3 is a plan, and Fig. 4 front end view.

Similar letters of reference in each of the several figures indicate corresponding parts.

The nature of my invention consists, first, in the combination, with a fire-furnace, of a sugar-evaporating pan when said pan is constructed and arranged so as to allow of a continuous circulation of the sirup in an indirect course over its surface during the process of boiling, substantially as hereinafter described.

It consists, second, in so arranging the pan on the furnace that a portion of its bottom-surface near each side shall not be exposed to the heat of the furnace, and thus while the intermediate surface of the bottom of the pan is intensely heated the other portions remain comparatively cool. This arrangement increases the ebullition at the center, but decreases it at the sides, and consequently a deposit and rest of the scum and feculent matter at the sides occurs, while the clarified juice continues its circulation and facilities for skimming off the same afforded.

It consists, third, in retarding the escape of the sirups or facilitating its escape, either by giving the pan a vibrating motion or a greater or less inclination, substantially as hereinafter described.

It consists, fourth, in an evaporating apparatus which allows of a circulation of the stream of sirup, boils it at the center of the pan and cools it at the sides of the same, and affords facilities for regulating the flow of the stream, substantially in the manner and for the purposes set forth.

To enable others skilled in the art to make and use my invention, I will proceed to describe the arrangement in which I have embodied the principle of operation of the same.

A represents an evaporating-pan; B, a fire-furnace; C C, rockers, and D D a stationary frame. These parts are constructed substantially as follows:

The pan A has its sides made preferably of wood; but they may be made of metal. Transversely to the pan, at proper distances apart, are arranged ledges or partitions *a a*, said ledges extending nearly across the pan. They strike out alternately from opposite sides of the same, so that a zigzag or indirect channel or passage from front to tail end, for the current to circulate through, is formed, as represented in the drawings. The arrows indicate the circulating current.

The furnace B consists of a deep fire-box, *b*, of less width and length than the pan. A flame-flue, *c*, of the same width, but of less depth, than the fire-box extends from the throat of the fire-box to the tail end of the pan, as represented. This flue communicates with a smoke passage or pipe, *d*, of the pan, as shown by the red arrows. It will be observed that a portion of the bottom of the pan forms the top of the furnace, and consequently the flame comes directly in contact with the bottom of the pan. It will also be observed that both sides of the pan and a portion of its bottom at both sides are isolated or kept from the contact of the heat from the furnace by reason of the furnace being of less width than the pan. The furnace and pan by this mode of construction are so brought together that both can be transported as one from place to place, rockers C C and frame D serving as a support or standard for the same. The rockers and frame also serve two other purposes—first, that of vibrating the pan, and thus causing a momentary retardation of the flowing sirup at times when the stream is thin and the fire slight; second, that of inclining the pan, as illustrated in Fig. 1, to insure the rapid flowing off of the sirup when the stream is thick and the fire or heat intense, these results being attained, first, by having the bottom board of the frame serve as a fulcrum for the pan to vibrate on, and, second, by having the evaporating apparatus as a whole attached to the frame by set-screws, which can be loosened, so as to allow said apparatus to be inclined, as seen in Fig. 1, and then tightened, so as to retain it in said inclined position.

My invention is a very important one, from this fact: The sirup is heated intensely at the center of the pan, then partially cooled as it flows at the sides. The rapid ebullition through the center of the pan causes the scum and feculent matter to be thrown off to the ends of the channels, and rest at the cool sides of the pan until removed by skimmers, the impurities of one channel being prevented from passing through the next channel by the ebullition at the center. The frequent cleansing of the stream as it passes from channel to channel secures its perfect defecation, and dispenses with the usual process of defecation by chemical agents.

My invention is also very important, because it renders practicable the boiling of sugar-juices while in motion, and consequently a shallow flowing stream, instead of a deep still body of liquor, is exposed to the fire. Having a shallow flowing stream pass over the heating-surface effects a uniform boiling without scorching the juice, and also enables the operator to know at a glance the condition of the sirup, and so time its flow that it shall reach the outlet *s* of the jam just as it arrives at the point of crystallization, and thereby avoid the danger of subjecting it too long to the action of heat, and thus prevent crystallization.

My invention is important, because it allows of the sirup being kept a longer or shorter time in contact with the heating-surface, according as the stream is shallow or deep or the fire intense or slight.

What I claim as my invention, and desire to secure by Letters Patent, is—

1. The combination, with a fire-furnace, of a sugar-evaporating pan, when said pan is constructed and arranged so as to allow of a continuous circulation of the sirup in an indirect course over its surface during the process of boiling, substantially as and for the purposes set forth.

2. So arranging the pan on the furnace that a portion of its bottom surface near each side shall not be exposed to the direct heat of the furnace, and thus while the intermediate surface of the bottom of the pan is intensely heated the other portions remain comparatively cool, substantially as and for the purposes set forth.

3. Retarding the escape of the sirup or facilitating its escape, either by giving the pan a vibrating motion or a greater or less inclination, substantially as and for the purposes set forth.

4. An evaporating apparatus which allows of a circulation of the stream of sirup, boils it at the center of the pan, and cools it at the sides of the same, and affords facilities for regulating the flow of the stream, substantially as and for the purposes set forth.

D. M. COOK.

Attest:

JOHN S. HOLLINGSHEAD,
AMON DUVALL.